(12) United States Patent
Shimotomai et al.

(10) Patent No.: US 7,411,408 B2
(45) Date of Patent: Aug. 12, 2008

(54) MEASUREMENT METHOD USING SOLAR SIMULATOR

(75) Inventors: Mitsuhiro Shimotomai, Okazaki (JP); Yoshihiro Shinohara, Okazaki (JP)

(73) Assignee: Nisshinbo Industries, Inc., Chuo-ku (JP)

( * ) Notice: Subject to any disclaimer, the term of this patent is extended or adjusted under 35 U.S.C. 154(b) by 0 days.

(21) Appl. No.: 11/454,123

(22) Filed: Jun. 16, 2006

(65) Prior Publication Data

US 2006/0290344 A1 Dec. 28, 2006

(30) Foreign Application Priority Data

| Jun. 17, 2005 | (JP) | ............................. 2005-178050 |
| Aug. 23, 2005 | (JP) | ............................. 2005-240884 |
| May 18, 2006 | (JP) | ............................. 2006-138713 |

(51) Int. Cl.
  *G01R 31/302* (2006.01)
(52) U.S. Cl. ...................................... 324/752
(58) Field of Classification Search ................. 250/200, 250/205
  See application file for complete search history.

(56) References Cited

U.S. PATENT DOCUMENTS

| 5,945,839 | A * | 8/1999 | Hyvarinen | ................ | 324/765 |
| 6,154,034 | A * | 11/2000 | Lovelady et al. | ............ | 324/765 |
| 6,541,754 | B2 * | 4/2003 | Matsuyama | ............... | 250/214.1 |
| 6,548,819 | B1 * | 4/2003 | Lovelady | .................. | 250/495.1 |
| 6,590,149 | B2 * | 7/2003 | Adelhelm | ............... | 250/504 R |
| 6,876,187 | B2 * | 4/2005 | Matsuyama | .................. | 324/96 |
| 6,946,858 | B2 * | 9/2005 | Matsuyama | ................. | 324/752 |
| 7,309,850 | B2 * | 12/2007 | Sinton et al. | ................ | 324/765 |
| 2002/0014886 | A1 * | 2/2002 | Matsuyama | .................. | 324/96 |
| 2002/0030153 | A1 * | 3/2002 | Matsuyama | ............. | 250/214.1 |
| 2004/0056648 | A1 * | 3/2004 | Matsuyama | .................. | 324/96 |

FOREIGN PATENT DOCUMENTS

| JP | 2886215 B | 2/1999 |
| JP | 2003-031825 A | 1/2003 |

* cited by examiner

Primary Examiner—Jermele M Hollington
(74) Attorney, Agent, or Firm—Smith Patent Office

(57) ABSTRACT

This invention provides a solar simulator measurement method capable of high-accuracy measurements with fast-response photovoltaic devices as well as with slow-response photovoltaic devices, and a solar simulator for implementing the method. A flash having a pulse waveform with a flattened peak is generated from a xenon lamp. The flash is sensed by an irradiance detector, its irradiance measured, and the irradiance of the light source is adjusted to fall within a prescribed narrow range based on the detected irradiance value. Then, the flash with irradiance within the prescribed range irradiates photovoltaic devices under measurement, and the current and the voltage output by the photovoltaic devices are measured at multiple points while a load of the photovoltaic devices is controlled. This process is repeated with multiple flashes to obtain an I-V curve for the photovoltaic devices.

16 Claims, 3 Drawing Sheets

- AQUIRE MULTIPLE DATA POINTS WITH ONE FLASH
- MEASURE IN FIVE FLASHES (APP. 5SEC)

MEASUREMENT METHOD USING SOLAR SIMULATOR

BACKGROUND OF THE INVENTION

1. Field of the Invention

The present invention relates to a measurement method using a solar simulator for high-speed, high-accuracy measurement of current-voltage characteristics (hereinafter also referred to simply as characteristics) of photovoltaic devices and the like and of photovoltaic devices panels.

2. Background of the Invention

The photoelectric conversion characteristics of photovoltaic devices, photo sensors and the like are measured by measuring the current-voltage characteristics of the photovoltaic devices under irradiance. In the measurement of the characteristics of photovoltaic devices, a graph is set up with voltage on the horizontal axis and current on the vertical axis and the acquired data is plotted to obtain a current-voltage characteristics curve. This curve is generally called an I-V curve.

As the measurement methods, there are methods that use sunlight as the irradiating light and methods that use an artificial light source as the irradiating light. Of the methods that use an artificial light source, methods that use a fixed light and methods that use a flash are described in, for example, Japanese Patent No. 2886215 and Laid-open Japanese Patent Application No. 2003-31825.

Conventionally, with the commercialization of photovoltaic devices, and particularly with photovoltaic devices with large surface areas, the current-voltage characteristics are measured under a radiation irradiance of 1000 W/m$^2$, which is sunlight standard irradiance. Measured values are corrected mathematically by formula so as to compensate for when irradiation during measurement exceeds or falls short of 1000 W/m$^2$.

In addition, measurement of the current-voltage characteristics of large-surface-area photovoltaic devices require irradiation of light with an irradiance of 1000 W/m$^2$ to a large-surface-area test plane uniformly. As a result, when using an artificial light source, for example, a high-power discharge lamp capable of providing several tens of kilowatts per square meter of radiation surface is required. However, in order to make such a high-power discharge lamp provide a fixed light it must be provided with a steady supply of high power. As a result, a very large scale equipment is required, which is impractical.

In addition, with a solar simulator that uses a steady light, a xenon lamp, a metal halide lamp or the like for continuous lighting is used for the light source lamp. FIG. 4 is a diagram showing the relation between irradiance and time for such lamps. As shown in this drawing, it usually takes several tens of minutes or more from the start of lighting of such lamps until irradiance stabilizes. Moreover, unless lighting is continued under the same conditions the irradiance does not reach saturation, and therefore a great deal of time is required until measurement is started. On the other hand, as the accumulated lighting time grows by long hours of lighting, the irradiance tends to decrease gradually, and thus the irradiance characteristics are not stable. In addition, the radiation of the light on the photovoltaic devices under measurement is conducted by changing shielding and irradiation of light with the opening and the closing of the shutter. Thus, the irradiation time required for the devices under test depends on the operating speed of the shutter, and often exceeds several hundred milliseconds. As the irradiation time lengthens the temperature of the photovoltaic devices itself rises, thus making accurate measurement difficult.

With a solar simulator that uses a fixed light, although it is necessary to maintain continuous lighting in order to stabilize the irradiance, doing so causes the temperature inside the housing that contains the light source to increase sharply. In addition, the parts inside the housing are constantly exposed to light, which causes the optical components (mirrors, optical filters, etc.) to deteriorate.

Further, once a fixed light source lamp is turned off and turned on again, it takes several tens of minutes for the irradiance to reach saturation. In order to avoid this, usually the fixed light source lamp is kept on and used as is. As a result, however, the accumulated lighting time of such fixed light lamps adds up easily, resulting in a tendency for such lamps to reach the end of their useful lives relatively quickly.

Therefore, when using a fixed light-type solar simulator in a photovoltaic devices module production line, the number of lamps that burn out is added to the running cost, which increases not only the cost of measurement but also the cost of production.

In addition, with a fixed light solar simulator, the length of time during which light from the light source irradiates the photovoltaic devices under measurement is relatively long. As a result, when I-V curve measurements are repeated for the same photovoltaic devices, the temperature of that photovoltaic devices rises. As the temperature of the photovoltaic devices rises its output voltage tends to decrease, and it is known that a rise in temperature also decreases maximum output Pmax.

In general, measurement of the photovoltaic devices current-voltage characteristics requires indicating standard test condition values. Here, the temperature of the photovoltaic devices in under standard test conditions is 25° C. and the radiation irradiance is 1000 W/m$^2$. The measurement of the current-voltage characteristics of photovoltaic devices by a solar simulator is carried out with the temperature range of the photovoltaic devices in the range of 15° C.-35° C. The temperature is corrected to the 25° C. that is the reference temperature using the measured temperature of the photovoltaic devices. The correction formula used for this purpose is prescribed by industry standard.

However, measurement of the temperature of the photovoltaic devices has the following problems and is not a simple matter. Photovoltaic devices used to supply power to general houses have a laminated construction, with a glass surface beneath which are EVA (ethyl vinyl acetate), the photovoltaic devices cell, and more EVA, with a plastic backing sheet on the back of the photovoltaic devices. When the temperature of photovoltaic devices with this sort of laminated structure is measured on the production line, only the temperature at the surface of the back sheet or at the front glass surface is measured. Therefore, even when the photovoltaic devices cell accepts the light irradiated from the solar simulator and the temperature temporarily rises, it is extremely difficult to measure the temperature of the photovoltaic devices cell itself correctly. This situation makes it difficult to measure the temperature of the photovoltaic devices cell accurately, and also makes it difficult to correct for the temperature correctly.

Accordingly, a method that measures the current-voltage characteristics of large-surface-area photovoltaic devices using a flash instead of a fixed light has been proposed. More specifically, there are two measurement methods: one is a single-flash light measurement method that uses a single flash light with relatively long flash duration and another one is a short-pulse flash measurement method that uses multiple flashes with a short flash duration. In both cases, a xenon lamp is used as a pseudo sunlight light source that generates the flash.

With either flash-based measurement method for measuring the current-voltage characteristics of photovoltaic devices, the problem of a rise in the temperature of the photovoltaic devices during measurement that arises in fixed light measurement methods is substantially nonexistent, and therefore errors caused by a temperature rise in the temperature of the photovoltaic devices cell do not arise easily.

In addition, in a solar simulator that performs data acquisition using a flash the flash duration is reduced, which has the advantage of alleviating the deterioration of the optical components of the fixed light solar simulator described above, which makes the lamp life relatively long.

FIG. 5 is a diagram showing a single flash waveform. Single flash is a method of causing a xenon lamp to fire using a direct current power source capable of outputting a large current. At the beginning of the light pulse waveform there is a portion in which the irradiance fluctuates sharply, after which the irradiance is constant. In a measurement method that uses a single flash, during the time when the irradiance becomes constant in the pulse waveform, the output of the photovoltaic devices are measured by acquiring data on current and voltage output from the photovoltaic devices under measurement while controlling a load of the photovoltaic devices.

However, it is known that the irradiance of a xenon lamp flash is uneven, and the flash must have an irradiance that is within a permissible range of ±5 percent. The irradiance is then corrected for according to the irradiance during flash, but when the characteristics of the photovoltaic devices are unknown and the permissible range is large, measurement accuracy deteriorates.

In addition, in order to obtain I-V characteristics curves with a single flash by sweeping the load of the photovoltaic devices, it is necessary to create a long pulse exceeding 100 milliseconds. In order to generate such a long pulse flash, the rest interval between one flash and the next must be long as well. As a result, if in the first generation of the flash the irradiance is insufficient and cannot be completely corrected, a long wait must be endured until the next generation of the flash. In addition, in order to fire a long pulse the load of the lamp must be large, which in turn shortens the life of the lamp.

In a measurement method that uses multiple short pulse flashes, the load of the light source lamp needed to fire the flash is small, and thus the flash can be fired at short intervals. In addition, because the flash duration is short, there is little change in conditions inside the lamp (for example, temperature), and therefore peak irradiance stabilizes easily. The photovoltaic devices under measurement are subjected to a light pulse that is short, and therefore its temperature does not rise much, either.

However, this type of short pulse flash measurement has the following problems. FIG. 6 is a diagram showing a waveform of a short pulse flash. As shown in this drawing, the waveforms of multiple flashes are mountain shaped with no flat part at their peaks (with the duration at the base of the mountain-shaped waveform being approximately 1 millisecond). As a result, in a single generation of a flash, only a single set of data (consisting of irradiance on the one hand and photovoltaic devices output current and voltage on the other) can be acquired. Further, when measuring a slow-response photovoltaic devices, the output response of the photovoltaic devices cannot track the irradiance waveform, which means that sometimes the measured output is lower than the true output.

SUMMARY OF THE INVENTION

The present invention is conceived as a solution to the various problems of the conventional solar simulator described above, and has as its object to provide a solar simulator measurement method that is capable of measuring accurately fast-response photovoltaic devices as well as slow-response photovoltaic devices.

To achieve the above-described object, according to a first aspect of the present invention there is provided a measurement method using a solar simulator, comprising the steps of generating from a light source a flash having a pulse waveform having a flattened peak, sensing the flash with an irradiance detector and measuring its irradiance, and controlling the irradiance of the light source to fall within a prescribed range based on the measured irradiance, irradiating photovoltaic devices under measurement with the flash, controlling a load of the photovoltaic devices, and measuring at one point current and voltage output from the photovoltaic devices, and generating flashes multiple number of times and performing the measurement step for each of the flashes.

Preferably, during a single flash the load is held constant and data is acquired in a latter half of the flash in which the output of the photovoltaic devices reach saturation.

In addition, the present invention provides a measurement method using a solar simulator, comprising the steps of generating from a light source a flash having a pulse waveform having a flattened peak, sensing the flash with an irradiance detector and measuring its irradiance, and controlling the irradiance of the light source to fall within a prescribed range based on the measured irradiance, irradiating photovoltaic devices under measurement with the flash, and measuring at multiple points current and voltage output from the photovoltaic devices while sweeping a load of the photovoltaic devices; and generating flashes multiple number of times and performing the measurement step for each of the flashes.

By optimizing the flash pulse duration and the flash interval and measuring over a prescribed narrow irradiance range, it is possible to perform high-accuracy measurement.

The measurement method may further comprise a preliminary measurement step of, prior to the measurement step, irradiating the photovoltaic devices under measurement with a flash from the light source, controlling the load and obtaining approximate values for characteristics of the photovoltaic devices.

For example, the measurement method may have a step of, prior to the measurement step, irradiating the photovoltaic devices under measurement with a flash from the light source, controlling the load and obtaining approximate values for characteristics of the photovoltaic devices, such as the short-circuit current Isc, the open circuit voltage Voc, and the maximum power Pmax.

The measurement method may be configured to have a generated flash which has a pulse waveform with a flattened peak having a duration of approximately 4 milliseconds or longer. Generation cycle of the flash may be 0.5 to 1.5 seconds. The method may have a configuration in which a response time of the photovoltaic devices under measurement to a measured irradiance waveform is calculated from a current/voltage waveform output from the photovoltaic devices under measurement, a speed to control the load of the photovoltaic devices are adequately adjusted, and the number of flash generations is increased or decreased, so as to perform data acquisition.

The method may have a configuration in which using a solar simulator wherein an irradiance setting of a flash generated from the light source is controlled according to either a ratio between a measured output of a short-circuit current of reference devices having calibrated data and corrected data for the short-circuit current or a ratio between a measured output of the reference devices having calibrated data and corrected data for the maximum power.

Besides an electronic load, a bi-polar power source and the like is used as the load for changing the output current and voltage.

Measurement of the current-voltage characteristics of the photovoltaic devices according to the present invention is performed as follows. First, a light source in which the applied voltage is controlled so as to produce a prescribed irradiance is made to generate multiple flashes to irradiate photovoltaic devices under measurement. The irradiance at this time is detected by an irradiance detector. The flash duration is short, and therefore any change in temperature of the light source is also small and the irradiance can be maintained substantially constant even with a short interval between flashes. In the present invention, data for the current and voltage of the photovoltaic devices under measurement is acquired only when the irradiance is at a prescribed irradiance or near a prescribed irradiance.

In other words, if the detected irradiance is outside a permissible range, the applied voltage is controlled and the flash is again generated, so as to bring the detected irradiance within the permissible range. If the detected irradiance is within the permissible range, then one or more of data for the current and the voltage output from the photovoltaic devices under measurement is collected while the load in a load circuit of the photovoltaic devices under measurement is controlled. The pulse waveform has a flattened portion at its peak, therefore the current-voltage characteristics of a slow-response photovoltaic devices, not to mention those of a fast-response photovoltaic devices, can be measured accurately by making the length of the flattened portion longer. While the load in the load circuit of the photovoltaic devices under measurement is controlled, the flashes are repeatedly generated multiple number of times, data for the current and the voltage at the desired measurement point or points is acquired and the I-V curve is obtained.

It should be noted that, prior to data acquisition in the measurement step described above, performing preliminary measurement is desirable. The same flash used in the main measurements is used to irradiate the photovoltaic devices under measurement, the load is swept, and approximate values for the short-circuit current Isc, the open circuit voltage Voc and the maximum power Pmax of the photovoltaic devices under measurement are obtained. Using these approximate values, the sweep of the load can be set according to the response of the photovoltaic devices under measurement, enabling the sweep speed during main measurement to be reduced. If the sweep of the load during preliminary measurement cannot be completed in a single flash, multiple flashes are used.

After preliminary measurement, the load is controlled depending on the characteristics of the photovoltaic devices under measurement, current and voltage data are acquired and the I-V curve obtained. Besides single-flash measurement, the main measurement following the foregoing preliminary measurement can also be carried out to obtain the IV curve using multiple flashes in a similar manner.

The above-described method enables measurement of the current-voltage characteristics of the photovoltaic devices to be carried out much more quickly and accurately compared to the conventional solar simulation methods.

In addition, it is possible to switch between a variety of measurement method, such as the method of keeping the load constant during a single flash, the method of sweeping the load, and further, after preliminary measurement, the method of measuring with a single flash and the method of measuring with multiple flashes described above. Switching between a variety of methods enables a single solar simulator to selectively switch between a high-speed/high-accuracy mode for measuring the current-voltage characteristics of relatively fast-response photovoltaic devices and a mode for measuring the current-voltage characteristics of relatively slow-response photovoltaic devices, making possible multiple uses of a single solar simulator as a result.

With the present invention the peak of the flash pulse waveform is flattened, thereby enabling a time during which the irradiance is stable to be secured, making possible measurement of the current-voltage characteristics of slow-response photovoltaic devices as well as fast-response photovoltaic devices.

In addition, in order for the light source to generate a pulse-type flash, the temperature of the light source and other conditions can be held constant so as to permit repeated generation at short intervals of flashes of stable irradiance. With stable irradiance, it becomes possible to perform measurement with irradiance that is within a narrow prescribed range, enabling high-accuracy measurement. In general, an irradiance correction conversion is carried out that converts the irradiance at measurement to a prescribed irradiance ($1000$ $W/m^2$), but in cases in which the relation between the irradiance and the photovoltaic devices output is non-linear or unknown, correction of the irradiance by proportional calculation merely increases the error if the difference between the measurement irradiance and the prescribed irradiance is large.

If the electronic load is swept either in discrete steps or continuously during generation of the flash, measurements can be taken at 100 to 200 points during a single flash, allowing high-speed measurement. In the case of slow-response photovoltaic devices, although the load may be held constant and measurement taken at a single point during a single flash, even when sweeping the load in a single flash it is still possible to perform measurement by lengthening the duration of the flattened part of the peak of the pulse waveform, making high-speed measurement possible.

Prior to the main measurement step involving controlling the load of the photovoltaic devices under measurement and measuring the current and the voltage, by carrying out a preliminary measurement operation of irradiating the photovoltaic devices under measurement with a flash from the light source and obtaining approximate values for the short-circuit current Isc, the open circuit voltage Voc and the maximum power Pmax which are the characteristics of the photovoltaic devices under measurement while sweeping the load of the photovoltaic devices, it is possible to control the load sweep speed to the characteristics of the photovoltaic devices under measurement so as to enable more efficient measurement.

Other features and advantages of the present invention will be apparent from the following description when taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will now be described in detail, with reference to the accompanying drawings.

Figure 1:
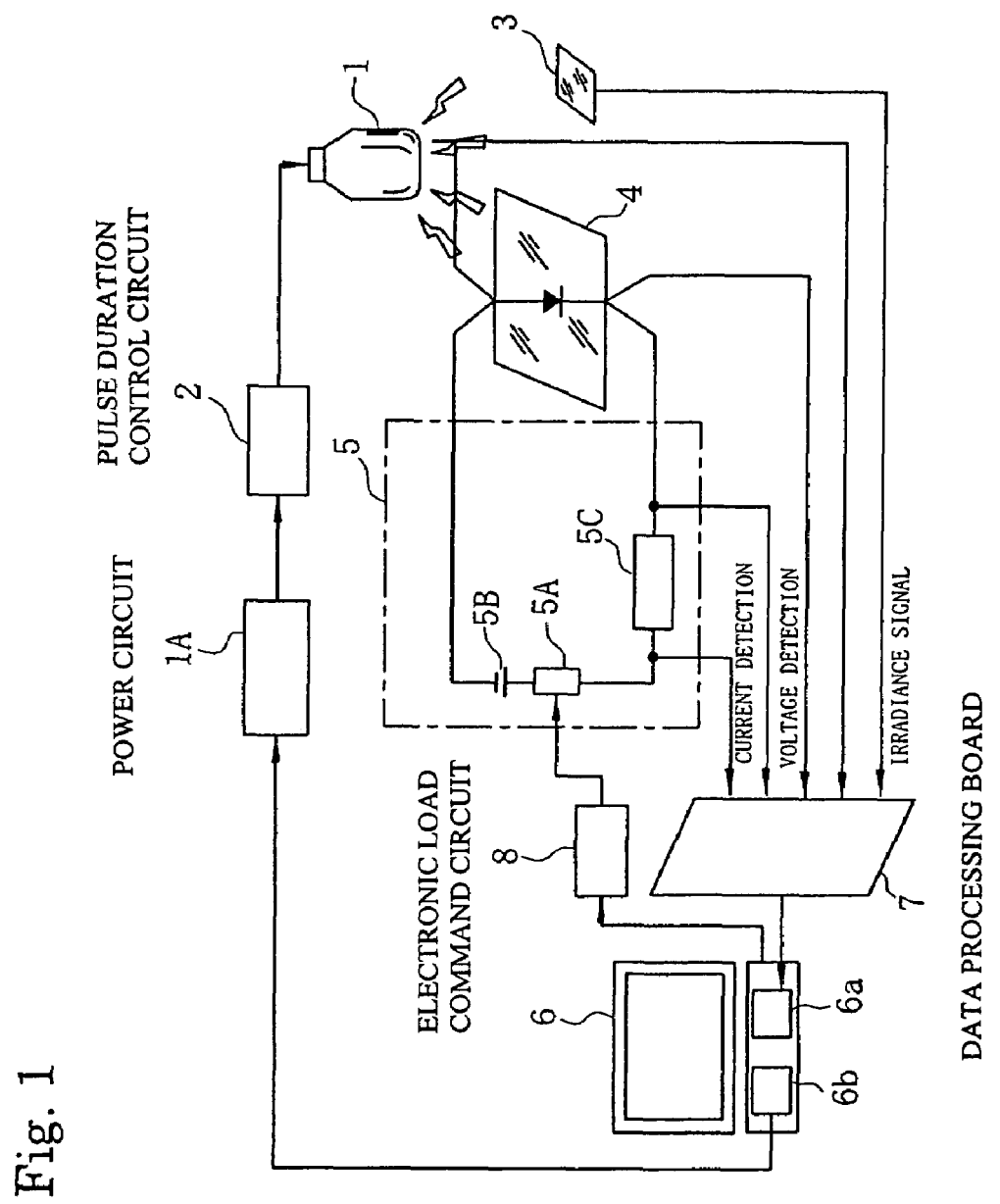
FIG. 1 is a block diagram showing one example of a solar simulator for implementing the measurement method of the present invention.
Figure 2:
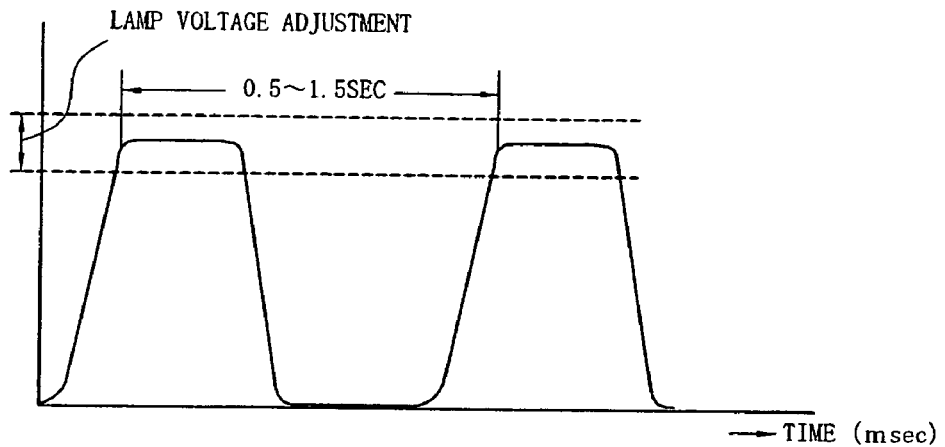
FIG. 2 is a waveform diagram showing schematically an example of an irradiance waveform of a middle flash using the measurement method of the present invention.
Figure 3:
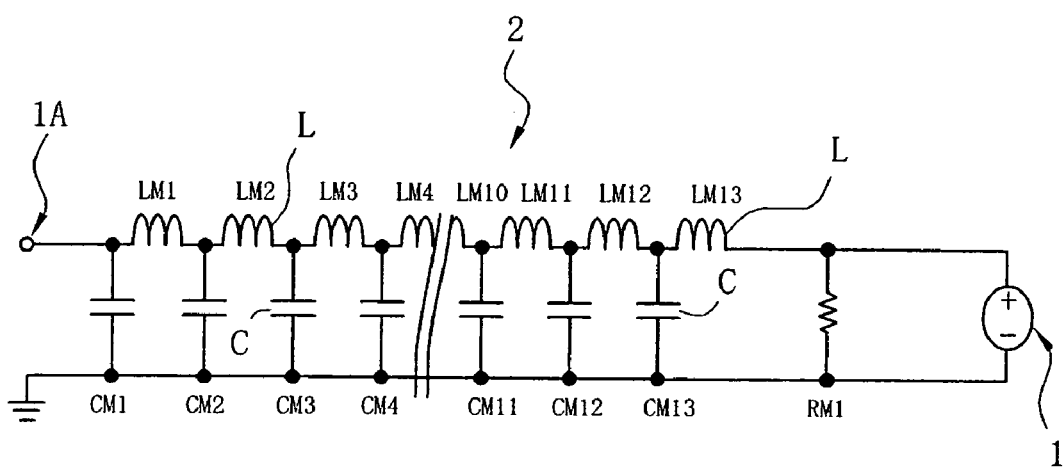
FIG. 3 is a block diagram showing a pulse length control circuit using an LC circuit that generates a flash having a flattened part on the peak of the pulse waveform as a light source in the present invention.
Figure 4:
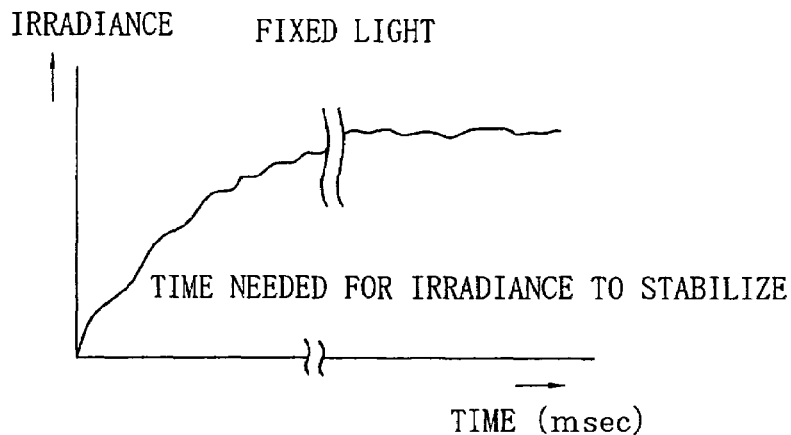
FIG. 4 is an irradiance waveform diagram showing schematically the waveform of light source light in a conventional solar simulator, showing the relation between irradiance and time in a fixed light.
Figure 5:
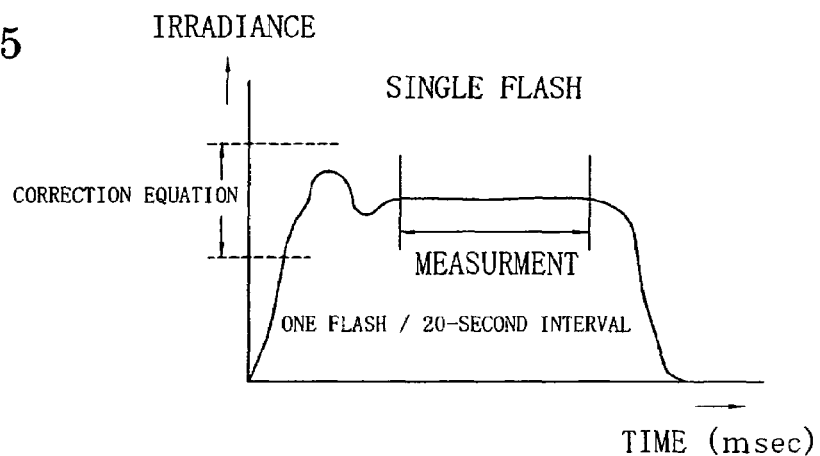
FIG. 5 is a diagram showing a single flash waveform.

The present invention uses a middle flash, which has a pulse duration that is shorter than that of a single flash but longer than that of a short pulse flash. FIG. 1 is a block diagram showing one example of a solar simulator for implementing the measurement method of the present invention. FIG. 2 is a waveform diagram showing schematically an example of an irradiance waveform of a middle flash used in the measurement method of the present invention. FIG. 3 is a block diagram showing a pulse length control circuit, minus an intermediate part, using an LC circuit that generates a flash having a flattened part on the peak of the pulse waveform used in the present invention.

In the solar simulator shown in FIG. 1 employing the measurement method of the present invention, a pulse duration control circuit 2 (or a pulse duration delay circuit 2) using a plurality of coils L and capacitors C as shown in FIG. 3 is provided on a power circuit 1A of a light source lamp, for example, a xenon lamp 1. Here, the capacities of the individual capacitors C and coils L are set so that the degree of flatness of the flattened top part of the irradiance waveform is a desired shape. By so doing, the power circuit 1A of the xenon lamp 1 can be controlled by the action of the pulse duration control circuit 2 in FIG. 3 so as to cause the xenon lamp 1 to generate a flash such that the flattened top part of the light pulse waveform lasts approximately 4 milliseconds or longer as shown schematically in the waveform diagram shown in FIG. 2. It should be noted that the pulse duration must be adjusted to response of the photovoltaic devices under measurement. For example, in the case of photovoltaic devices with a fast response, the flattened top part of the pulse waveform shown in FIG. 2 can be shortened to less than 4 milliseconds. Conversely, in the case of photovoltaic devices with a slow response, the flattened top part of the pulse waveform shown in FIG. 2 is 4 milliseconds or longer, for example, approximately 10 milliseconds. In the case of photovoltaic devices with an extremely slow response, this flattened top part of the pulse waveform may be adjusted to approximately 100 milliseconds, to give one example.

If the duration of the light pulse is 4 to 20 milliseconds at the flattened top part of the pulse, then by setting the flash generation cycle to approximately 0.5 to 1.5 seconds it is possible to obtain a stable irradiance avoiding overheating the xenon lamp 1. It should be noted that an arrangement in which the pulse duration is expanded by using a direct current power source capable of outputting large currents to cause the xenon lamp 1 to generate a flash can also be used as the light source of the solar simulator that implements the measurement method of the present invention.

In the foregoing embodiment, the irradiance of the xenon lamp 1 that generates the flash, as shown in FIG. 1, is detected by an irradiance detector 3 near photovoltaic devices 4 fixedly mounted where it can receive light from the xenon lamp 1. For the detector 3, it is preferable to use photovoltaic device cells having the same performance as the photovoltaic devices under measurement.

With the solar simulator of the present invention, the current/voltage output from the photovoltaic devices 4 under measurement disposed opposite the xenon lamp 1 is varied. As a result, an electronic load 5A of a load circuit 5 is connected to the output terminal of the photovoltaic devices 4 under measurement. It should be noted that, in the load circuit 5 provided with the electronic load 5A, 5B indicates a direct current power source and 5C indicates a shunt resistance. Alternatively, the electronic load 5A and the direct current power source 5B may be replaced by a bipolar power source or the like.

Data on the current and the voltage output that the above-described photovoltaic devices 4 outputs and the irradiance detected by the irradiance detector 3 is acquired by a data acquisition system. The data acquisition system, as shown in FIG. 1, is configured so as to connect to a computer 6 equipped with a data acquisition board 6a and an analog output board 6b a data processing board 7 that converts analog output signals into signals that can be acquired by the data acquisition board 6a. It should be noted that reference numeral 8 indicates an electronic load command circuit connected so as to supply data from the computer 6 to the electronic load 5A.

Conventional irradiance calibration is performed as follows: Photovoltaic devices that serve as reference devices having calibrated data are substituted for the photovoltaic devices 4 under measurement and disposed where the photovoltaic devices 4 under measurement are to be positioned, and the irradiance detector 3 is disposed at a predetermined position. Corrected data for the short-circuit current Isc and the maximum power Pmax of the calibrated reference device at a prescribed irradiance (1000 W/m$^2$) is available, and this corrected data is set in the data acquisition board 6a. Then, the xenon lamp 1 is turned on and the output of the calibrated reference device and the output of the irradiance detector 3 are measured. The lamp voltage or the lamp current are successively adjusted and measurement repeated so that the measured output of the calibrated reference device matches the corrected data, and the output of the irradiance detector 3 when the measured output of the calibrated reference device matches the corrected data is stored to complete calibration of the irradiance. Accordingly, irradiance calibration is conventionally carried out by a long process of trial and error requiring a great deal of time.

After the irradiance is calibrated, the calibrated reference device is removed and replaced with the photovoltaic devices 4 under measurement. The lamp voltage or the lamp current is controlled so that the irradiance detected by the irradiance detector 3 is equal to the irradiance stored as described above, and measurement on the vicinity of the prescribed irradiance is performed.

In the present invention, the widely known interrelation between irradiance and photovoltaic devices output (Isc, Pmax) is incorporated into a software that functions as a calculator. In the stage of measuring the calibrated reference device as described above, a target irradiance at the irradiance detector 3 is calculated from the measured output of the calibrated reference device and the corrected data using an equation expressing that widely known interrelationship and stored. In the next measurement of the calibrated reference device, the lamp voltage is controlled so that the irradiance at the irradiance detector 3 becomes the target irradiance and measurement is executed. Therefore the measured values for the calibrated reference device are measurements made with data that is close to the corrected data, which makes it possible to calibrate the irradiance with very many fewer tries than with the conventional trial-and-error method.

In the present embodiment the data acquisition board 6a compares the irradiance detected by the irradiance detector 3 with a pre-set, prescribed irradiance (1000 W/m$^2$) using the calculator of the computer 6. Then, based on the results of the calculation performed at the calculator, the output commands of the analog output board 6b that adjusts the voltage that is applied to the xenon lamp 1 light source are controlled and hence the irradiance is adjusted.

The xenon lamp 1 generates a short-duration flash, and therefore experiences virtually no increase in temperature. Accordingly, even when generating flashes at intervals of 0.5 to 1.5 seconds prescribed irradiance (1000 W/m$^2$), by adjusting the lamp voltage based on the output at the irradiance detector 3 it is possible to generate stable flashes in a state in which the prescribed irradiance is maintained with a high degree of accuracy.

Thus, as described above, the present invention enables self-adjustment of the irradiance of the xenon lamp 1 by the irradiance detector 3 and the calculator of the computer 6, making it possible to perform in a short time the irradiance adjustment that conventionally requires a great deal of time because it is performed manually. In addition, since the irradiation time is not so long, the photovoltaic devices under measurement do not experience a rise in temperature. Therefore, the present invention redresses the problem of the conventional technique, in which the long period of irradiation induces changes in the characteristics of the photovoltaic devices and as a result makes accurate measurement difficult.

The solar simulator of the present invention is an example of an apparatus configured as described above. Then, the xenon lamp 1 is caused by an appropriate lamp voltage to generate a flash and the irradiance detector 3 detects the irradiance of the flash. The detected irradiance is then compared to a prescribed value (1000 W/m$^2$) by the calculator of the data acquisition board 6a through the data processing board 7. If the detected irradiance is the same as or close to the prescribed value (a range called the permissible range), then it is used as is in the measurement of the photovoltaic devices 4.

Measurement is performed by generating flashes multiple number of times. When the detected irradiance varies with respect to the prescribed value and is either higher or lower than the permissible range, the lamp voltage is either increased or decreased as appropriate with every flash, such that the irradiance is automatically corrected to the prescribed value (which is to be understood to include the permissible range). By understanding in advance how the irradiance varies with lamp voltage it is possible to adjust the irradiance by the lamp voltage.

When the irradiance is near the prescribed value, the output from the electronic load command circuit 8 adjusts the electronic load 5A connected to the photovoltaic devices 4 to adjust the current output from the photovoltaic devices 4. The electronic load command circuit 8 either sweeps the electronic load 5A by continuously adjusting it or by varying it in discrete steps. The data acquisition system, which consists mainly of the computer 6 and the data processing board 7, can collect approximately 100 to 200 points of data on the irradiance as well as the photovoltaic devices 4 output current and voltage for the purpose of obtaining an I-V curve during a single flash of the xenon lamp 1. If the main measurement is performed after the preliminary measurement by generating flashes multiple number of times and the I-V curve is obtained in a similar manner, it is possible to measure 400 or more sets of data.

It should be noted that, in the present invention preliminary measurement is performed prior to measurement. The preliminary measurement is carried out using the same flash as in the main measurement. During the flash, the sweep speed is increased, the electronic load 5A is varied over a wide range, and approximate values for the short-circuit current Isc and the open circuit voltage Voc of the photovoltaic devices 4 under measurement are obtained. By obtaining these approximate values the sweep range of the electronic load 5A can be fixed and the sweep speed during main measurement can be reduced. The preliminary flash may be carried out by using multiple flashes. Using multiple flashes enables the accuracy of the approximate values to be enhanced, such that, during the main measurement to follow, the sweep of the load can be better adjusted to the characteristics of the photovoltaic devices under measurement.

Once the approximate values for the short-circuit current Isc and the open circuit voltage Voc are obtained as described above, a flash is generated to create the I-V curve. In a single flash the electronic load 5A is swept and data corresponding to 100 to 200 points along the I-V curve are obtained. Then, at a point near the edge of the flattened top part of the waveform of the light pulse, data acquisition is terminated and the xenon lamp 1 is turned off. During this time, in order to prepare for the next flash, the lamp voltage is controlled. After a pre-set time interval has elapsed, the next flash is generated, the irradiance is compared in the same way as the technique described above, acquisition of the data for the next output characteristics and the process is repeated. The measurement points at each flash partially overlap to facilitate connection. In the embodiment of the present invention, data at 400 points can be collected in two flashes and an I-V curve can be obtained. Therefore, even if two flashes are used in the preliminary measurement, the measurement is completed in a total of four flashes. The interval between the flashes is 0.5 to 1.5 seconds, permitting measurement in approximately 5 seconds. In the main measurement, the number of flashes can be adjusted upward depending on the response of the photovoltaic devices 4 under measurement.

Thus, as described above, data acquisition of the number of points of data required to measure the characteristics of the photovoltaic devices 4 under measurement and the I-V curve is made from the acquired data. As can be appreciated by those skilled in the art, the present invention is not limited to the specific examples described above with respect to the number of flashes needed for confirmation and adjustment of the irradiance, the number of flashes needed for short-circuit current detection, or the number of flashes needed for I-V data measurement.

In addition, in the present embodiment, in the adjustment of the electronic load 5A, besides adjusting the current, alternatively the voltage can be adjusted. Moreover, in the data acquisition stage, the irradiance signals are sequentially recorded during the elapsed time and the current and voltage signals of the photovoltaic devices 4 corresponding to the time may be recorded. Based on calculations of this recorded data, the output response delay of the photovoltaic devices under measurement to the irradiance can be calculated. Calculating and varying the sweep speed and the number of flashes depending on this output response delay enables measurement adjusted to the response delay to be performed.

It should be noted that, in the present embodiment, during a single flash the electronic load 5A is swept and multiple points of data are acquired. However, the present invention is not limited thereto. Alternatively, for example, a single data point may be acquired without sweeping the electronic load. When measuring a very slow-response photovoltaic devices, during a single flash the load is held constant and data is acquired during the latter half of the light pulse, in which the output from the photovoltaic devices under measurement reaches saturation. The duration of the flattened top part of the light pulse waveform is lengthened according to the response of the photovoltaic devices. For example, the duration of the flattened part, which is normally 4 milliseconds, is made to 8 to 10 milliseconds.

Figure 6:
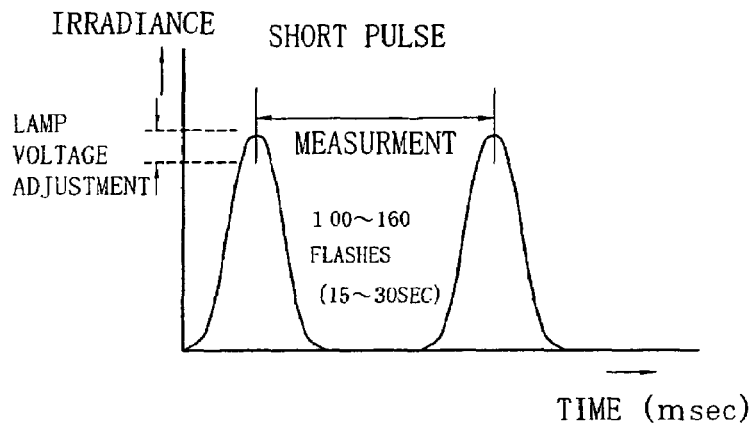
FIG. 6 is a diagram showing a short pulse flash waveform.

The short pulse flashes shown in FIG. 6 have no flattened part of the pulse waveform, and therefore cannot be used to measure slow-response photovoltaic devices. However, in the present invention, there is a flattened part of the pulse waveform, and therefore can be used to measure slow-response photovoltaic devices correctly. In addition, the flash interval can also be maintained at approximately 0.5 to 1.5 seconds.

Conversely, the duration of the flattened part of a single flash may be lengthened for example, to 10 milliseconds or longer, and data acquired at 400 points or more during a single flash.

The present invention as described above provides the following effects and is extremely useful industrially:

(1) Sweeping the load in discrete steps during a single flash enables measurement to be performed using a small number of flashes and makes it possible to shorten the measurement time. For example, if the flash cycle is approximately 1 sec and measurement is performed using five flashes, then it is possible to achieve high-speed measurement performed in a measurement time of approximately 5 seconds. By contrast, the conventional short pulse-type measurement method uses 100 to 160 flashes and the measurement time is approximately 15 to 30 seconds.

(2) The control speed of the electronic load is adjusted depending on response of the photovoltaic devices under measurement, and therefore even a slow-response photovoltaic devices can be measured at high speed and with high accuracy.

(3) Since the duration of a single flash is short and the state of the light source is easy to keep constant, the irradiance can be adjusted to a prescribed irradiance or very close to a prescribed irradiance, thereby virtually eliminating any room for irradiance correction error and thus making high-accuracy measurement possible. In addition, since measurement is performed at or near the prescribed irradiance, highly accurate measurement can be achieved even when the relation between the irradiance and the photovoltaic devices output current is unclear.

(4) Characteristics of the photovoltaic devices are measured using a small number of flashes, therefore the number of measurements which will be performed until the lamp burns out can be increased several times more than that with the conventional technique. In addition, since the photovoltaic device characteristics can be measured with only a small number of flashes, the photovoltaic devices under measurement experience little or no increase in temperature due to reception of the light from the flash during measurement.

As many apparently widely different embodiments and variations of the present invention can be made without departing from the spirit and scope thereof, it is to be understood that the present invention is not limited to the specific embodiments thereof described herein but rather only to the extent set forth in the following claims.

This application claims the benefit of Japanese Patent Application No. 2005-178050, filed on Jun. 17, 2005, which is hereby incorporated by reference herein in its entirety.

What is claimed is:

1. A measurement method using a solar simulator, comprising the steps of:
    generating from a light source a flash having a pulse waveform having a flattened peak having a duration of approximately 4 to 100 milliseconds;
    sensing the flash with an irradiance detector and measuring its irradiance, and controlling the irradiance of the light source to fall within a prescribed range based on the measured irradiance;
    irradiating photovoltaic devices under measurement with the flash, controlling a load of the photovoltaic devices, and measuring at one point current and voltage output from the photovoltaic devices; and
    generating flashes multiple number of times and performing the measurement step for each of the flashes.

2. The measurement method using a solar simulator according to claim 1, further comprising a preliminary measurement step of, prior to the measurement step, irradiating the photovoltaic devices under measurement with a flash from the light source, controlling the load and obtaining approximate values for characteristics of the photovoltaic devices.

3. The measurement method using a solar simulator according to claim 1, wherein generation cycle of the flash is 0.5 to 1.5 seconds.

4. The measurement method using a solar simulator according to claim 1, wherein a response time of the photovoltaic devices under measurement to a measured irradiance waveform is calculated from a current/voltage waveform output from the photovoltaic devices under measurement, a speed to control the load of the photovoltaic devices are adequately adjusted, and the number of flash generations is increased or decreased, so as to perform data acquisition.

5. The measurement method using a solar simulator according to claim 1, wherein an irradiance setting of a flash generated from the light source is controlled according to either a ratio between a measured output of a short-circuit current of reference devices having calibrated data and corrected data for the short circuit current or a ratio between a measured output of a maximum power of the reference devices having calibrated data and corrected data for the maximum power.

6. The measurement method using a solar simulator according to claim 1, wherein said step of generating from a light source includes a starting voltage 0 at a beginning portion of the flash and an ending voltage 0 at an ending portion of the flash.

7. A measurement method using a solar simulator, comprising the steps of:
    generating from a light source a flash having a pulse waveform having a flattened peak having a duration of approximately 4 to 100 milliseconds;
    sensing the flash with an irradiance detector and measuring its irradiance, and controlling the irradiance of the light source to fall within a prescribed range based on the measured irradiance;
    irradiating photovoltaic devices under measurement with the flash, and measuring at multiple points current and voltage output from the photovoltaic devices while sweeping a load of the photovoltaic devices; and generating flashes multiple number of times and performing the measurement step for each of the flashes.

8. The measurement method using a solar simulator according to claim 7, further comprising a preliminary measurement step of, prior to the measurement step, irradiating the photovoltaic devices under measurement with a flash from the light source, controlling the load and obtaining approximate values for characteristics of the photovoltaic devices.

9. The measurement method using a solar simulator according to claim 7, wherein generation cycle of the flash is 0.5 to 1.5 seconds.

10. The measurement method using a solar simulator according to claim 7, wherein a response time of the photovoltaic devices under measurement to a measured irradiance waveform is calculated from a current/voltage waveform output from the photovoltaic devices under measurement, a speed to control the load of the photovoltaic devices are adequately adjusted, and the number of flash generations is increased or decreased, so as to perform data acquisition.

11. The measurement method using a solar simulator according to claim 7, wherein an irradiance setting of a flash generated from the light source is controlled according to either a ratio between a measured output of a short-circuit current of reference devices having calibrated data and corrected data for the short circuit current or a ratio between a measured output of a maximum power of the reference devices having calibrated data and corrected data for the maximum power.

12. The measurement method using a solar simulator according to claim 7, wherein said step of generating from a light source includes a starting voltage 0 at a beginning portion of the flash and an ending voltage 0 at an ending portion of the flash.

13. A measurement method using a solar simulator, comprising the steps of:

generating from a light source a flash having a pulse waveform having a flattened peak having a duration of approximately 1 to 100 milliseconds;

sensing the flash with an irradiance detector and measuring its irradiance, and controlling the irradiance of the light source to fall within a prescribed range based on the measured irradiance;

irradiating photovoltaic devices under measurement with the flash, controlling a load of the photovoltaic devices, and measuring at one point current and voltage output from the photovoltaic devices; and generating flashes multiple number of times and performing the measurement step for each of the flashes.

14. The measurement method using a solar simulator according to claim 13, wherein said step of generating from a light source a flash includes using a pulse waveform having a flattened peak having a duration of less than 4 milliseconds.

15. A measurement method using a solar simulator, comprising the steps of:

generating from a light source a flash having a pulse waveform having a flattened peak having a duration of than approximately 1 to 100 milliseconds;

sensing the flash with an irradiance detector and measuring its irradiance, and controlling the irradiance of the light source to fall within a prescribed range based on the measured irradiance;

irradiating photovoltaic devices under measurement with the flash, and measuring at multiple points current and voltage output from the photovoltaic devices while sweeping a load of the photovoltaic devices; and generating flashes multiple number of times and performing the measurement step for each of the flashes.

16. The measurement method using a solar simulator according to claim 15, wherein said step of generating from a light source a flash includes using a pulse waveform having a flattened peak having a duration of less than 4 milliseconds.

* * * * *